Sept. 16, 1969  L. E. HERSHEY  3,467,396
INTERNALLY COOLED SEAL ASSEMBLY
Filed May 10, 1967

INVENTOR.
LOWELL E. HERSHEY
BY
Woodhams, Blanchard & Flynn
ATTORNEYS

3,467,396
INTERNALLY COOLED SEAL ASSEMBLY
Lowell E. Hershey, Portage, Mich., assignor to Durametallic Corporation, Kalamazoo, Mich., a corporation of Michigan
Filed May 10, 1967, Ser. No. 637,506
Int. Cl. F16j 15/40, 15/44, 15/16
U.S. Cl. 277—74                          10 Claims

ABSTRACT OF THE DISCLOSURE

A mechanical seal construction for use between a wall and a shaft extending therethrough and rotatable relative thereto, wherein the mechanical seal has a pair of sealing members having mutually contacting sealing faces, a first sealing member being fixed with respect to the wall and a second sealing member being capable of rotation in response to rotation of the shaft. An enclosure means cooperable with said seal construction defining a chamber, has a first portion being rotatable with said second sealing member and a second portion being fixed with respect to said wall, said first and second portions thereof defining an annular passageway extending away from said chamber. A ring of external diameter substantially equal to the external diameter of the annular passageway is disposed within the chamber and adjacent the passageway so that rotation of the shaft will result in the ring being centrifugally forced against the walls defining the passageways thereby sealing the chamber.

BACKGROUND OF THE INVENTION

Field of the invention

This invention relates to a seal assembly, such as of the so-called "inside" type, having means to make possible the use with the seal of a larger volume of quenching, absorbing, cooling or other controlling liquid than has previously been possible, particularly where appreciable leakage of such liquid cannot be permitted.

DESCRIPTION OF THE PRIOR ART

While the apparatus of the invention is applicable to a wide range of devices wherein a rotatable shaft extends through a wall, said wall usually being a portion of a closed vessel in which a fluid pressure is created, it is particularly adaptable to such devices as pumps or autoclaves. Accordingly, for the purposes of discussion, reference will be made hereinafter to the use of such invention with pumps. Such specific reference will, however, be clearly understood as being illustrative only and importing no limitation in the use or applicability of the invention.

Mechanical seals for rotating shafts, such as in or with the stuffing box of a centrifugal pump, normally are grouped into either of two well-known classes, which classes are commonly termed "inside seals" or "outside seals" depending on whether the sealing faces thereof are inside of or outside of the stuffing box of the equipment being sealed. In the earlier days of the development of these seals the outside seals were considered more convenient from the standpoint of installation, inspection and servicing while the inside seals, for reasons well understood by those skilled in the art, were more satisfactory from such standpoints as lubrication, capacity to withstand high pressures and temperature control.

Although these concepts were at one time considered well established, the advantages of both types of seals were sufficiently attractive that development work continued on them and several improvements have been made. One improvement in the outside type of seal is illustrated in the Hummer Patent No. 3,155,393, assigned to the same assignee as the present invention, which permits a quantity of liquid, sometimes called a "quench" liquid, to flow around and in contact with sealing members of an outside type of seal. However, the inside type of seal has remained difficult to cool by any previously known device of other than considerable complexity and, as a result, though highly effective for high pressures, the inside type of seal has remained limited in use to applications involving only low or moderate temperatures unless relatively elaborate cooling means are provided. Thus, a need has existed for many years for simple means permitting proper quenching of an inside type of seal to maintain same cool and properly lubricated.

Accordingly, the objects of this invention include:

(1) To provide fluid-tight means for supplying a fluid, for temperature control and other purposes, to the rotating parts of a mechanical sealing assembly, particularly of the "inside" type, said assembly operating between a rotating shaft and a wall through which said shaft extends.

(2) To provide means, as aforesaid, for cooling the radially inner surfaces of the relatively rotatable mechanical seal parts of an inside seal by supplying through simple means a coolant to a chamber in heat transfer communication with said inside seal.

(3) To provide means, as aforesaid, including a simple device providing a fluid-conducting housing including a fluid-conducting chamber in heat transfer communication with at least a portion of the rotating member of an inside seal type of mechanical sealing assembly and wherein very simple means are further provided for minimizing, or substantially preventing, the escape of such fluid from said chamber.

(4) To provide means, as aforesaid, wherein through simple means sufficiently large volumes of quench liquid can be used with a mechanical seal of the inside type as to render it capable of high temperature use while maintaining the inherent advantages of inside mechanical seals from the standpoint of high pressure, space saving and washing by pump fluid.

(5) To provide means, as aforesaid, which without requiring complex means can be converted from a condition of only minor leakage, which will be acceptable for many uses, to a condition of no discernible leakage at all, as will be required for other uses, by the addition of a simple part which addition can be made easily and inexpensively.

(6) To provide means, as aforesaid, which will involve relatively little additional maintenance problems.

(7) To provide means, as aforesaid, which will be appropriate for use either with an independently pressurized external pressure system or with pressure supplied from the interior of the equipment with which such seal is being used.

(8) To provide means, as aforesaid, which can be provided at relatively low original cost.

SUMMARY

In general, the objects and purposes of the invention are met by providing a mechanical seal construction for use between a wall and a shaft extending therethrough and rotatable relative thereto, wherein the mechanical seal has a pair of sealing members having mutually contacting sealing faces. One of the sealing members is fixed with respect to the wall whereas the other sealing member is positioned on one side of the sealing member and capable of rotation in response to the rotation of the shaft. The improvement of this invention generally comprises enclosure means positioned on an opposite side of said one sealing member and defining a chamber. A first portion of the enclosure means is rotatable with the other of said sealing members. A second portion of the enclosure means is fixed with respect to the wall. Both the first and second portions of the enclosure means include wall means defining an annular passageway extending from the chamber. A ring of external diameter substantially equal to the internal diameter of the annular passageway is located in the chamber adjacent said passageway. The ring is of greater axial width than the passageway so that rotation of the shaft results in the ring being centrifugally forced against the walls defining said passageway thereby sealing the chamber.

Other objects and purposes of the invention will be apparent to persons acquainted with devices of this general type upon reading the following disclosure and inspecting the accompanying drawing.

Figure 1:
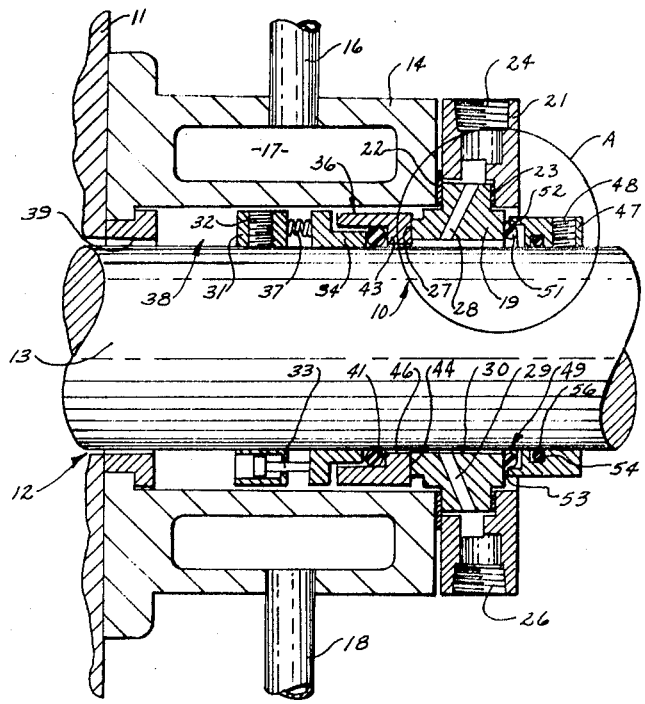
FIGURE 1 is a central sectional view of the mechanical seal embodying the invention.
Figure 2:
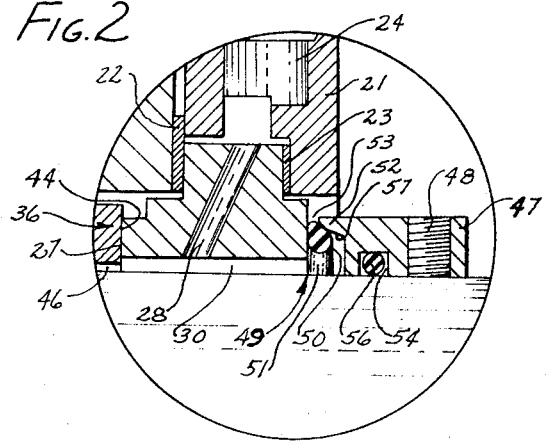
FIGURE 2 is an enlarged fragment of the portion of FIGURE 1 indicated at A therein.

Certain terminolgy will be used in the following description for convenience in reference only and will not be limiting. The words "upwardly," "downwardly," "leftwardly" and "rightwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar importance.

DESCRIPTION OF THE PREFERRED EMBODIMENT

Referring now to the drawing, there is shown a wall 11 which may for illustration here be taken for the wall of a centrifugal pump, autoclave, turbine or generally similar equipment having an opening 12 through which extends a rotatable shaft 13.

A housing 14 enclosing a seal 10 is secured to the wall 11 by conventional means, such as bolts (not shown) and has an inlet 16 connected to an annular passageway 17 extending around the shaft 13. The housing 14 is further provided with an outlet 18 connected to the passageway 17 to permit the egress of a cooling fluid introduced to the passageway 17 through the inlet opening 16 by pumping means not shown.

The mechanical seal 10 comprises a stationary annular element 19 which surrounds the shaft 13. In the illustrated embodiment of the invention, the annular element 19 is a gland insert which is mounted in a gland 21. The gland 21 is secured to the housing 14 by conventional means such as bolts (not shown), and suitable sealing means 22 and 23, such as gaskets, are provided between the annular element 19 and the gland 21 and the housing 14. The bland 21 has an opening 24 for supplying coolant to the gland insert 19. A further opening 26 is provided in the gland 21, in a conventional fashion, to permit the cooling fluid to exit therefrom. The gland insert 19 has an axially extending projection which projects into the housing 14. The inner end of the gland insert 19 has an accurately finished radial seal surface 27. The gland insert 19 can be made of any suitable material, such as carbon.

The nonrotating sealing member 19 is provided with an opening 28 extending from the radially outer surface through to the radially inner surface thereof, adjacent the inlet opening 24 in the gland 21. Likewise, the nonrotating sealing member 19 is provided with an opening 29 which extends in a like manner from the radially outer surface through to the radially inner surface thereof, and is adjacent the outlet opening 26.

The nonrotating sealing member 19 is radially spaced from the shaft 13 to define a clearance 30 therebetween.

A collar 31 encircles and is fixedly secured to, the shaft 13 by suitable means, such as one or more set screws 32. The collar 31 has a plurality of drive pins 33, of which one appears in FIGURE 1, extending into suitable openings (not shown) in the annular seal ring 34. The annular seal ring 34 is urged against the rotating sealing member 36 in part mechanically by any convenient and known means, which are here indicated as being a plurality of springs 37 which are compressed between the collar 31 and the annular seal ring 34 and in part by fluid pressure entering the chamber 38 from the pump through the clearance 39. An O-ring 41 is disposed between the annular seal ring 34 and the rotating sealing member 36.

The rotating sealing member 36 has an annular axial projection 43 which is provided with an accurately finished radial seal surface 44. The rotating sealing member 36 is urged against the nonrotating sealing member or gland insert 19 so that the sealing surface 44 is urged against the sealing surface 27 to form a seal therebetween. A clearance 46 is provided between the rotating sealing member 36 and the shaft 13 in a well-known manner to provide a slightly floating relationship between the rotating sealing member 36 and the shaft 13 for the purpose of maintaining alignment between the two sealing members 19 and 36. The clearances 30 and 46 of the seal construction define a chamber 49 into which the coolant is introduced by the inlet 24.

It will be recognized by those skilled in the art that all of the foregoing-described seal structure is conventional and may be varied widely within the scope of the invention. It is set forth here in some detail solely for background purposes and to insure a complete understanding of the following-described portion thereof wherein the substance of the invention is embodied.

A rotating jacket 47, is secured to the shaft 13 by any convenient means, such as set screw 48. The jacket 47 is axially spaced from the nonrotating sealing member 19 and encloses the annular chamber 49. The radial extension 50 of the chamber 49 defined by the jacket 47 houses an elastomeric ring 51 which bears snugly against the radially outer wall of said extension and which is capable of axial movement therewithin. The right end of the radial extension is of small axial extent so that said ring 51 is always relatively close to the leftward side of said extension 50 for reasons appearing hereinafter. The leftward extremity of the rotating jacket part 47 has an axially extending, annular flange 52 which is spaced axially from the rightward surface of the stationary sealing member so as to form an annular passageway 53 therebetween which communicates between the leftward side of the extension 50 near said ring and the atmosphere. The inner surface 57 of the flange 52 is tapered slightly for reasons discussed hereinafter.

The inner surface of the jacket member 47 is provided with an annular recess 54 into which an O-ring 56 is disposed to seal the jacket 47 onto the shaft 13.

OPERATION

Although the operation of the device embodying the invention has been indicated somewhat above, said operation will be described in detail hereinbelow to assure a more complete understanding of the invention.

Fluid of any desired type is admitted through the inlet opening 24 and is exhaustible through the outlet opening 26 wherein the relative rate of flow in and out may be adjusted by any convenient means, not shown, to maintain the desired conditions of operation of said seal, which conditions usually pertain to temperature control requirements but which may also include other features mentioned above. The fluid also passes through the opening 28 in the nonrotating sealing member 19, into the chamber 49 defined by the clearance 30 between the nonrotating sealing member 19 and the shaft 13, the clearance 46 between the rotating sealing member 36 and the shaft 13, and the O-ring 41. Upon being filled with fluid, the chamber 49 is under pressure greater than atmospheric pressure whereas the passageway 53 is only under atmospheric pressure. The elastomeric ring 51 is forced, by the pressure differential existing between the atmospheric pressure in the passageway 53 and the fluid pressure in the chamber 49, into contact with the surface defining the rightward end of the passageway 53 thereby sealing said chamber from the passageway before appreciable fluid can escape from the chamber 49 through the passageway 53. It will be noted that because of its proximity to the passageway 53, only a small pressure differential is required to move the ring 51 into its sealing position and it will also be noted that the force with which the elastomeric ring seals the chamber 49 from the passageway 53 will be a function of the difference in pressures within the chamber and the passageway and the centrifugal force on the ring when the shaft is rotating. The tapered surface 57 serves to hold the ring 51 generally in the region of the passageway 53. Thus, a satisfactory seal is obtained without undue wear on the elastomeric ring 51 caused by the relative rotation of the jacket 47 and the nonrotating sealing member 19 against which the elastomeric ring 51 bears.

The particular embodiment herein utilized to illustrate the invention assumes that a low pressure at the inlet 24 will be sufficient to provide the desired throughput of quenching liquid and hence only a low pressure will exist within the chamber 49. This means that the ring 51 is urged against the relatively moving surfaces adjacent thereto by only a light pressure and will consequently have only small rate of wear. In the experimental work carried out thus far with this invention, the ring 51 wore at a lesser rate than that of the sealing members 19 and 36 themselves and hence the use of this ring is not a factor effecting the total useful life if a given sealing assembly. It is conceivable, however, that where a higher throughput of quenching liquid is required between the inlet opening 24 and the outlet opening 26, a somewhat higher pressure can be utilized with no disadvantageous results excepting a higher wear rate on the ring 51.

Hence, the coolant is permitted to cool the nonrotating sealing member 19 by passing through the openings 28 and 29 as well as cooling the inner surfaces of the nonrotating sealing member 19 and the rotating sealing member 36 adjacent the sealing surfaces 27 and 44. Thus, a seal is provided for a quench liquid which has no discernable leakage and can be made very easily and inexpensively.

Although a particular embodiment of the invention has been hereinabove described in detail for illustrative purposes, it will be recognized that obvious or equivalent variations or modifications of such disclosure are fully contemplated.

The embodiments of the invention in which an exclusive property or privilege is claimed are defined as follows.

I claim:
1. In a mechanical seal construction for use between a wall and a shaft extending therethrough and rotatable relative thereto, wherein said mechanical seal has a pair of sealing members having mutually contacting sealing faces, one sealing member being fixed with respect to said wall and the other sealing member being positioned on a first side of said one sealing member and being capable of rotation in response to rotation of said shaft, the improvement comprising:
enclosure means including a portion positioned adjacent a second side of said one sealing member opposite said first side and defining a chamber, said portion of said enclosure means being rotatable with said other sealing member, and said portion of said enclosure means and said one sealing member including wall means defining an annular passageway extending radially outwardly from said chamber; and
a ring of external diameter substantially equal to the internal diameter of said annular passageway and located within said chamber adjacent said annular passageway, said ring being of greater axial width than said passageway;
whereby rotation of said shaft results in said ring being centrifugally forced against the radially inner edges of said wall means defining said passageway thereby sealing said chamber.

2. The mechanical seal construction defined in claim 1, including means for introducing a pressurized fluid into said chamber of said enclosure means, whereby said pressurized fluid will urge said ring against the wall means defining said passageway and seal said fluid against escape from within said chamber.

3. The mechanical seal construction defined in claim 1, wherein said ring is of elastomeric material.

4. The mechanical seal construction defined in claim 1, including tapered wall means associated with the portion of said enclosure means for guiding said ring into sealing relationship with the wall means defining said passageway.

5. The mechanical seal construction defined in claim 1, including means for holding said ring generally in the region of said passageway.

6. The mechanical seal construction defined in claim 1, wherein said enclosure means includes a second portion fixed with respect to said wall, said second portion being used for maintaining said one seal, member in fixed relation with respect to said wall, and wherein said second portion of said enclosure means includes an inlet and an outlet opening for allowing cooling fluid to pass therethrough.

7. The mechanical seal construction defined in claim 1, wherein said portion of said enclosure means comprises a cup-shaped collar member nonrotatably secured to said shaft, said collar member having thereon an annular flange extending axially in a direction toward the rear wall of said one sealing member, the end face of said flange being spaced from said rear wall to define said annular passageway therebetween, said flange and said rear wall defining said chamber in surrounding relationship to said shaft, and said ring comprising a resilient O-ring positioned within said chamber adjacent the radially inner peripheral wall of said flange for sealing said annular passageway.

8. A mechanical seal construction for use between a wall and a shaft extending through and rotatable relative to said wall, said seal construction comprising:
first seal means affixable to said shaft for rotation therewith, said first seal means including a first sealing member having a first sealing face thereon;
second seal means being fixed with respect to said wall, said second seal means including a second seal member having a second seal face thereon, said first and second sealing members being positioned adjacent one another in side-by-side relationship with said first and second sealing faces being in rotatable sliding contact with one another;
said first seal means further including a closure member positioned adjacent one of said sealing members on a side thereof opposite from the position of the other sealing member, said closure member being rotatable with said shaft and having a portion defining an annular chamber in surrounding relationship with said shaft;
said portion of said closure member and said second seal means including wall means defining an annular passageway extending radially outwardly from said chamber; and
a resilient ring of external diameter substantially equal to the internal diameter of said annular passageway and located within said chamber adjacent said passageway, said ring being of greater axial width than said passageway;

whereby rotation of said shaft results in said ring being centrifugally forced against the radially inner edges of said wall means defining said passageway to thereby seal said chamber.

9. A mechanical seal construction as defined in claim 8, wherein said second seal means includes a gland member fixedly secured to said wall, said gland having an opening therein in communication with said chamber for introducing a pressurized fluid into said chamber whereby said pressurized fluid will urge said ring against the wall means defining said passageway to prevent escape of fluid from said chamber.

10. A mechanical seal construction as defined in claim 8, further including tapered wall means associated with said portion of said closure member for guiding said resilient ring into sealing relationship with the radially inner edges of said wall means defining said passageway.

References Cited

UNITED STATES PATENTS

| | | | |
|---|---|---|---|
| 3,145,542 | 8/1964 | Aronson | 277—15 X |
| 3,155,393 | 11/1964 | Hummer | 277—74 |

SAMUEL ROTHBERG, Primary Examiner

U.S. Cl. X.R.

277—65